United States Patent [19]
Morofuji

[11] Patent Number: 5,745,799
[45] Date of Patent: Apr. 28, 1998

[54] IMAGE BLUR PREVENTION APPARATUS

[75] Inventor: Tsuyoshi Morofuji, Yokohama, Japan

[73] Assignee: Canon Kabushiki Kaisha, Tokyo, Japan

[21] Appl. No.: 305,938

[22] Filed: Sep. 19, 1994

Related U.S. Application Data

[63] Continuation of Ser. No. 980,615, Nov. 23, 1992, abandoned.

[30] Foreign Application Priority Data

Nov. 22, 1991 [JP] Japan ................... 3-332866

[51] Int. Cl.$^6$ ........................................ G03B 17/00
[52] U.S. Cl. ............................................... 396/55
[58] Field of Search ........................ 354/400, 402, 354/430, 202, 456, 70; 396/52–55

[56] References Cited

U.S. PATENT DOCUMENTS

| | | | |
|---|---|---|---|
| 5,084,724 | 1/1992 | Maeno | 354/430 |
| 5,150,150 | 9/1992 | Enomoto | 354/456 |
| 5,172,150 | 12/1992 | Teramoto et al. | 354/202 |
| 5,210,563 | 5/1993 | Hamada et al. | 354/400 |
| 5,229,603 | 7/1993 | Shiomi | 250/231.1 |
| 5,231,445 | 7/1993 | Onoki et al. | 354/430 |
| 5,266,981 | 11/1993 | Hamada et al. | 354/400 |
| 5,282,044 | 1/1994 | Misawa et al. | 354/70 |
| 5,459,542 | 10/1995 | Fujiwara et al. | 396/55 |
| 5,463,443 | 10/1995 | Tanaka et al. | 396/55 |
| 5,541,693 | 7/1996 | Enomoto | 396/53 |

FOREIGN PATENT DOCUMENTS

| | | |
|---|---|---|
| 0195921 | 10/1986 | European Pat. Off. . |
| 0200442 | 11/1986 | European Pat. Off. . |
| 0358196 | 3/1990 | European Pat. Off. . |
| 0481230 | 4/1992 | European Pat. Off. . |

OTHER PUBLICATIONS

Patent Abstracts of Japan, vol. 14, No. 328, Jul. 13, 1990.

*Primary Examiner*—Russell E. Adams
*Attorney, Agent, or Firm*—Fitzpatrick, Cella, Harper & Scinto

[57] ABSTRACT

An image blur prevention system includes a blur detecting circuit for detecting the blurring of an image and outputting a blurring signal corresponding thereto. A determination circuit is also provided in the system for determining, in response to the blurring signal output by the blur detecting circuit, that an image plane movement is taking place when the image blurring signal does not cross a central point of an output range of the blurring signal within a predetermined time period.

32 Claims, 7 Drawing Sheets

IMAGE BLUR PREVENTION APPARATUS

This application is a continuation of application Ser. No. 07/980,615, filed Nov. 23, 1992, now abandoned.

BACKGROUND OF THE INVENTION

1. Field of the Invention

The present invention relates to improvements in an image blur prevention apparatus which detects an image blurring state of an optical apparatus caused by vibrations being applied to the optical apparatus, and which corrects the blurring of the image by using a correcting optical system, such as a variable apical angle prism. More particularly, the present invention relates to an image blur prevention apparatus which detects vibrations applied to an optical apparatus, such as a camera, and corrects the shaking of the optical axis of the optical apparatus caused by the vibrations.

2. Description of the Related Art

A camcorder will be used as an example to explain the related art.

In recent years, the important photographing operations, such as focusing or diaphragm adjustments, have been automated, and the possibility that users unfamiliar with such operations may make mistakes during photographing has been reduced. As camcorders have become smaller in size and lighter in weight, they can be carried around conveniently, and photographing can be performed easily while holding a camcorder with one hand.

However, because of such one-handed photography, blurring of photographed images has become more conspicuous. Accordingly, techniques for preventing photographing mistakes arising from camera shake have been recently studied.

Camera shake usually produces vibrations having a frequency of approximately 1 to 12 Hz. To make it possible to photograph images with no blur even if such camera shake occurs, vibrations of the camcorder arising from the camera shake must be detected in order to adjust or displace a correction optical system proportionally to the detected vibration displacement value. Therefore, to correct image blur, it is important to accurately detect vibrations of the camera.

Detection of vibrations of a camcorder, fundamentally speaking, can be performed within a camcorder which incorporates a shaking detection system comprising an angular acceleration sensor (which outputs angular acceleration signals), an angular velocity sensor (which outputs angular velocity signals), and an integrator (which integrates, in first order or second order, the angular acceleration signal and angular velocity signal, and outputs an angular velocity signal and an angular displacement signal).

A block diagram of a shaking detection system using an angular velocity sensor will now be explained with reference to FIG. 6.

FIG. 6 is a block diagram showing a system for detecting longitudinal and lateral vibrations of a camcorder in the directions of pitch (PITCH) indicated by arrow 54a and yaw (YAW) orthogonal to the plane of the FIG. 6 drawing sheet intersecting each other at right angles and also intersecting the optical axis. Reference numeral 52 denotes a lens barrel having a correction optical system for correcting image blur. Angular velocity sensors 53a and 53b (not shown) for detecting very small angular velocities of longitudinal and lateral vibrations of the camcorder are mounted at arbitrary positions near the lower and the side portions of the front of the lens barrel in such a manner that they match the correction axes of the correction optical system.

A case will now be described in which a correction system integrates an angular velocity signal θ (detected by the angular velocity sensors 53a and 53b) using integrators 55a and 55b (not shown), converts the signal into an angular displacement signal d, and corrects image blur by using the converted angular displacement signal d as a detected blur signal.

FIG. 7(A) shows the operation of the first-order integrator 55a where the angular velocity signal θ input to the integrator 55a is converted into the angular displacement signal d. However, actually, as shown in the angular velocity signal in FIG. 7(B), the angular velocity sensor 53a contains a small amount of direct current components as bias components. If an output containing such bias is integrated directly by the integrator 55a, the bias components are also integrated. As a result, the angular displacement signal contains errors, as shown in FIG. 7(B).

To solve the above problem, a method has been considered in which a high pass filter (hereinafter referred to as a HPF) is connected to the input terminal to the integrator 55a. That is, in the considered method, a HPF 56a is added, as indicated in FIG. 6. Thus, as regards the angular velocity signal θ detected by the angular velocity sensor 53a, an output having direct current components or extremely low frequency components is blocked by the HPF 56a (and by a HPF (not shown) 56b for the angular velocity sensor 53b). As a result, the amount of bias components integrated by the integrators 55a and 55b becomes smaller. Therefore, driving the correction optical system by a blur signal corresponding to the integrated output (the angular displacement signal d) in this arrangement enables image blur to be eliminated.

The HPFs 56a and 56b are each made up of a resistor 57 and a capacitor 58, as shown in, for example, FIG. 8. Each of the integrators 55a and 55b is made up of an operational amplifier 59, a capacitor 60, and a resistor 61, also shown in FIG. 8.

The blocking frequency of the HPF 56a which blocks the sensor output having direct current components or extremely low frequency components as mentioned above is determined by the time constant formed by the resistor 57 and the capacitor 58. Since the frequency of camera shake possible during a photographing operation is usually between approximately 1 to 12 Hz as mentioned earlier, the blocking frequency should be set low so as not to affect this range. To be specific, the resistor 57 is set at "3 MΩ", the capacitor 58 at "1 µF", and the time constant at "3 seconds". This enables the bias components to be eliminated while the influence upon the detection of camera shake is reduced.

However, this type of apparatus has difficulty in achieving rapid image plane movement such as panning or tilting, because of the lack of responsiveness and the limited range of correction of the correction means. Thus, the camcorder apparatus is difficult to adapt to such a correction system.

Generally, the photographing, of moving pictures may be broadly classified into the following two photographic modes.

One is a mode in which photographing is performed continuously with one picture composition, and the other is a mode in which photographing is performed continuously while the picture composition is being changed, that is, when camera work, such as panning or tilting, is being performed. In the former photographic mode, since photographing is performed with the same picture composition, image blur, in particular during high magnification zooming, is problematical. A conventional shake-proof photographic apparatus reduces image blur in this photographic mode. In the latter photographic mode, it is important for the picture composition to be determined at will by the photographer.

If a photographic apparatus in which shake-proof characteristics are set so as to suppress image blur in the former photographic mode is used in the latter photographic mode, this apparatus cannot quickly respond in the direction of photographing that the photographer desires, lowering the maneuverability of the camera considerably. This is because when the image plane is moved rapidly (for example, when panning or tilting is performed), this is determined to be camera shake, and a correction function to suppress the effects of this movement is activated.

As described above, the function for suppressing image blur conflicts with the responsiveness of the camera for a rapid image plane movement by the photographer. In a photographic apparatus having this type of blur prevention function, the blur correction function has been hitherto suppressed or nullified in the latter photographic mode. However, such an arrangement in which the former photographic mode is distinguished from the latter photographic mode by an input from a switch (by the photographer), and in which the blur correction characteristics are changed according to that switch must be avoided from the standpoint of maneuverability. That is to say, it is desirable that the blur correction characteristics be changed automatically according to the photographer's operation of the camera. Furthermore, the changing of blur correction characteristics must be accurately performed so that the quality of the photographed image is not diminished, and the photographer is not made to feel uneasy.

In other words, to realize the above-mentioned objects, means capable of reliably judging whether camera shake, rapid image plane movement (a panning or tilting operation), or a flow shot (e.g., with a still camera) operation has occurred is required.

SUMMARY OF THE INVENTION

According to one aspect of the present invention, there is provided an image blur prevention apparatus for use with an optical apparatus, comprising blur detecting means for detecting an image blur state and determination means which determines that an image plane is moving when the blur displacement of the image does not intersect a central point of the image blur for a predetermined amount of time, in response to the blur detecting means. The image blur prevention apparatus is capable of automatically and reliably determining that the image plane is moving because signals from the blurring detecting means do not become zero displacement signals for the predetermined amount of time except in the case of image plane movement, such as panning, thus increasing the responsiveness of the image plane movement operation. Also, the quality of the image is not diminished, and the photographer is not made to feel uneasy.

According to another aspect of the present invention, there is provided an image blur prevention apparatus, comprising: blur detecting means; and determination means which determines, in response to the blur detecting means, that the movement of the image plane is terminated when the blur displacement of the image intersects a central point of the image blur for a predetermined number of times. The image blur prevention apparatus is thus capable of automatically and reliably determining that the movement of the image plane is terminated, and of smoothly shifting from the image plane movement operation to the normal blur correction operation.

Other aspects of the present invention will become apparent from the following description of the preferred embodiments of the present invention.

DETAILED DESCRIPTION OF THE PREFERRED EMBODIMENTS

Preferred embodiments of the present invention will now be described with reference to the accompanying drawings.

Figure 1:
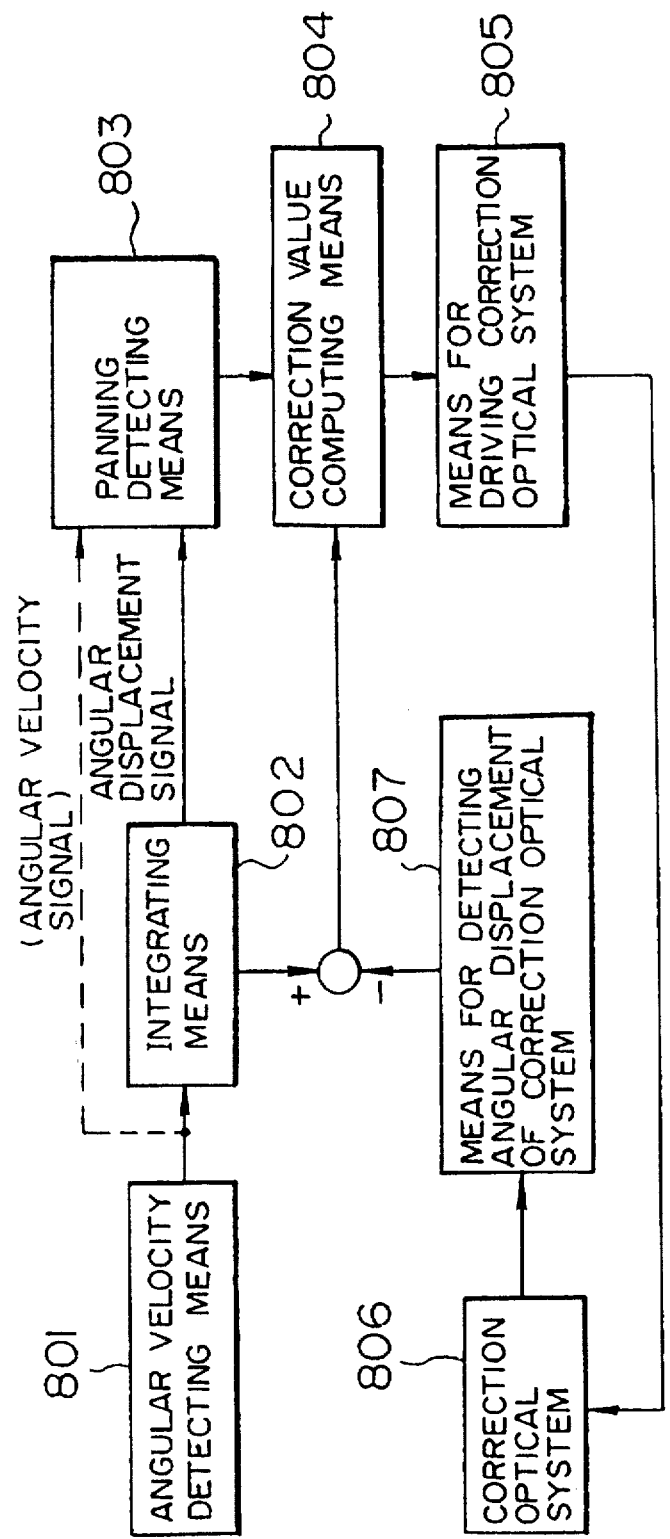
FIG. 1 is a circuit block diagram of an image blur prevention apparatus according to a first embodiment of the present invention.

FIG. 1 is a block diagram of an image blur prevention apparatus provided in an optical apparatus, such as a camera, according to the first embodiment of the present invention.

Figure 6:
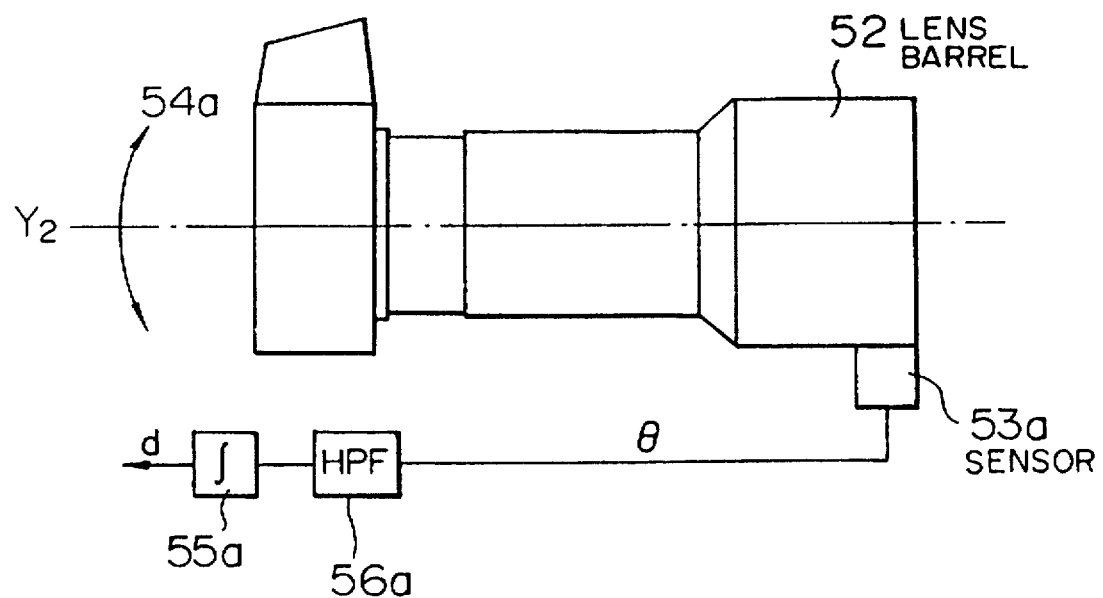
FIG. 6 is a view schematically illustrating the construction of a conventional image blurring prevention apparatus.
Figure 8:
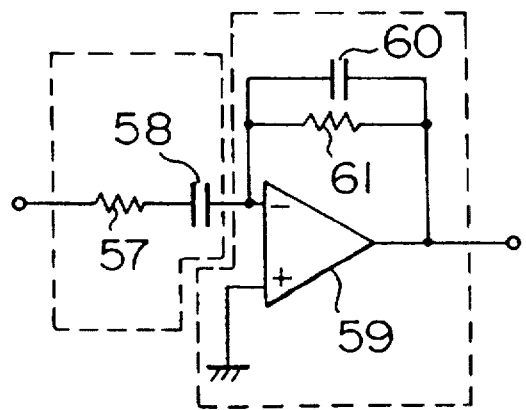
FIG. 8 is a circuit diagram illustrating the construction of an integrator and HPFs shown in FIG. 6.
Figure 7A:
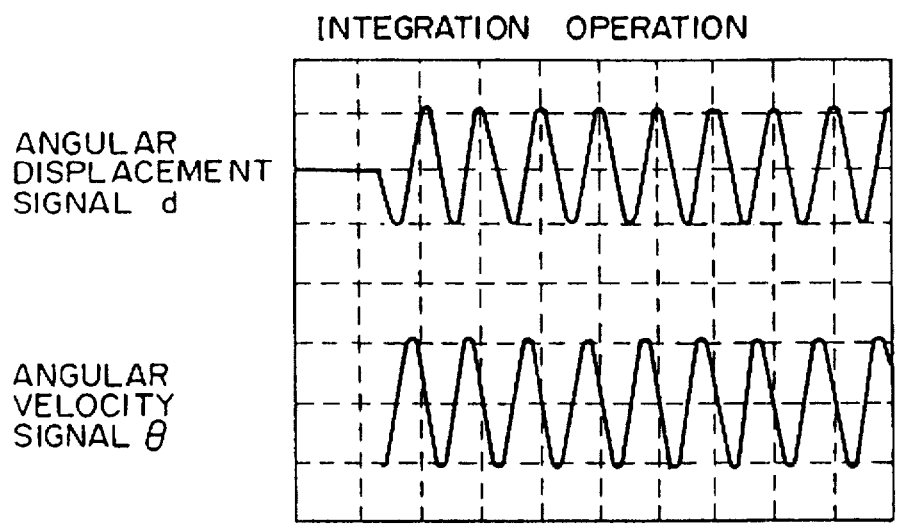
FIG. 7 is a chart illustrating signal waveforms from the conventional image blurring prevention apparatus.
Figure 7B:
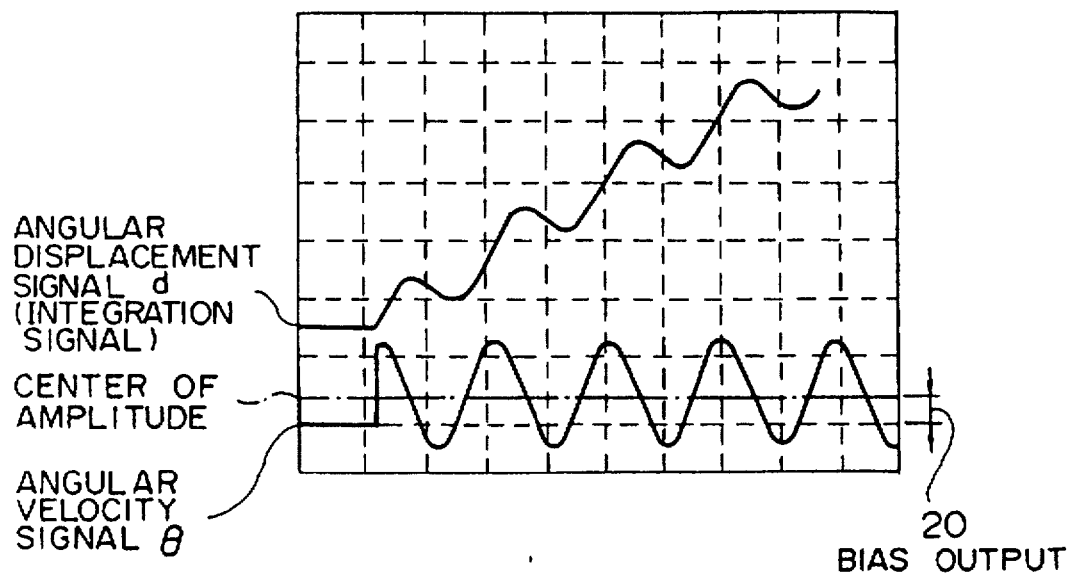

Referring to FIG. 1, reference numeral 801 denotes an angular velocity detecting means for detecting camera shake or the like of an optical apparatus, such as a camera; reference numeral 802 denotes an integrating means for integrating angular velocity signals (actually, signals in which bias components are removed by a HPF shown in FIG. 6 or the like) from the angular velocity detecting means 801 and converting them into angular displacement signals; and reference numeral 803 denotes a panning detecting means for determining whether camera shake arises from panning, tilting, or a flow shot (for brevity, reference to tilting, or a flow shot will be omitted hereinafter) on the basis of angular displacement signals from the integrating means 802. The details of the determination operation will be described later with reference to FIG. 2. Reference numeral 804 denotes a correction value computing means for generating, in response to an output from the panning detecting means 803, a driving signal for positioning a correction optical system 806 at its movable center (the point at which the optical axis of an optical apparatus, such as a camcorder, matches the optical axis of the correction optical system 806) when the current photographic mode is the panning mode. The correction value computing means 804 outputs an angular displacement signal, that is, a correction signal corresponding to a differential signal between a camera shake signal and the displacement of the correction optical system 806 when the current photographic mode is not the panning mode at that time. Reference numeral 805 denotes means for driving the correction optical system 806 in response to the driving signal from the correction value computing means 804; reference numeral 807 denotes means for detecting the angular displacement of the correction optical system, which means detects tie amount of displacement from the movable center of the correction optical system 806.

Figure 2:
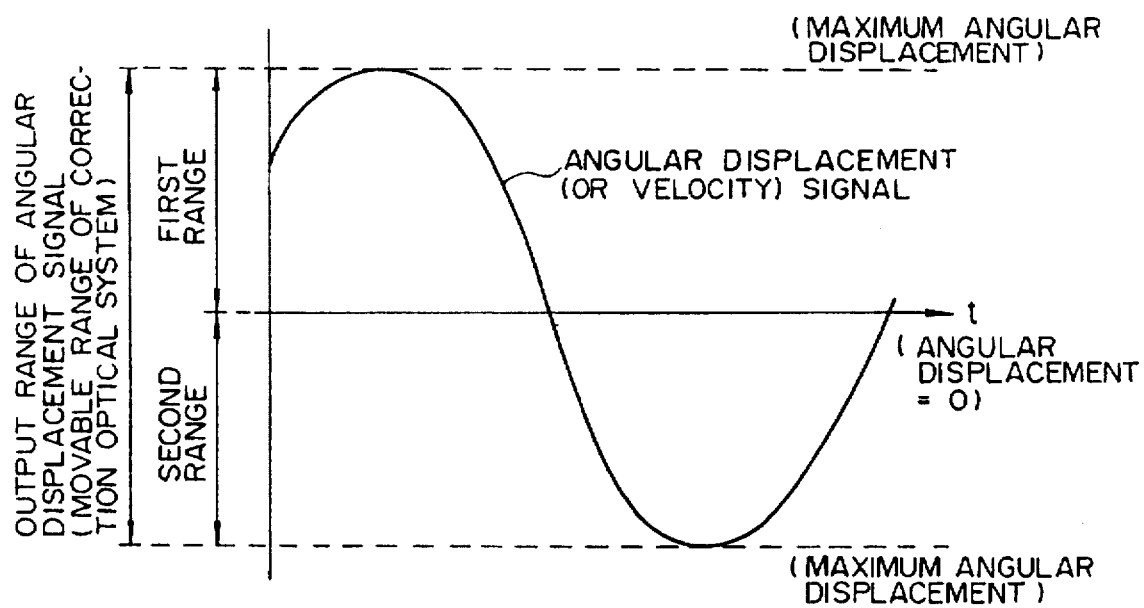
FIG. 2 illustrates detection of panning according to the first embodiment of the present invention.

FIG. 2 illustrates detection of panning by the panning detecting means 803.

The panning detecting means 803 divides the range of output signals from the angular velocity detecting means 801 at each position within the total range (the movable range) in which the correction optical system 806 can be displaced (the output range of the angular displacement signal via the integrating means 802, or the output range of the direct angular velocity signal not via the integrating means 802) with respect to the central point (when the angular displacement signal is "0"). The panning detecting means 803 determines whether the camera is panning according to the time (or the number of sampling times representing the time) during which the output signal remains in one range.

When camera shake is thought to be like an alternating current, even if the frequency of the camera shake is taken to be 0.5 to tens of Hz, it can be assumed that the output signal from the angular velocity detecting means 801 crosses the central point at intervals of less than one second. Therefore, when it does not cross the central point within a predetermined time, a determination is made that the photographic apparatus is panning.

Figure 3:
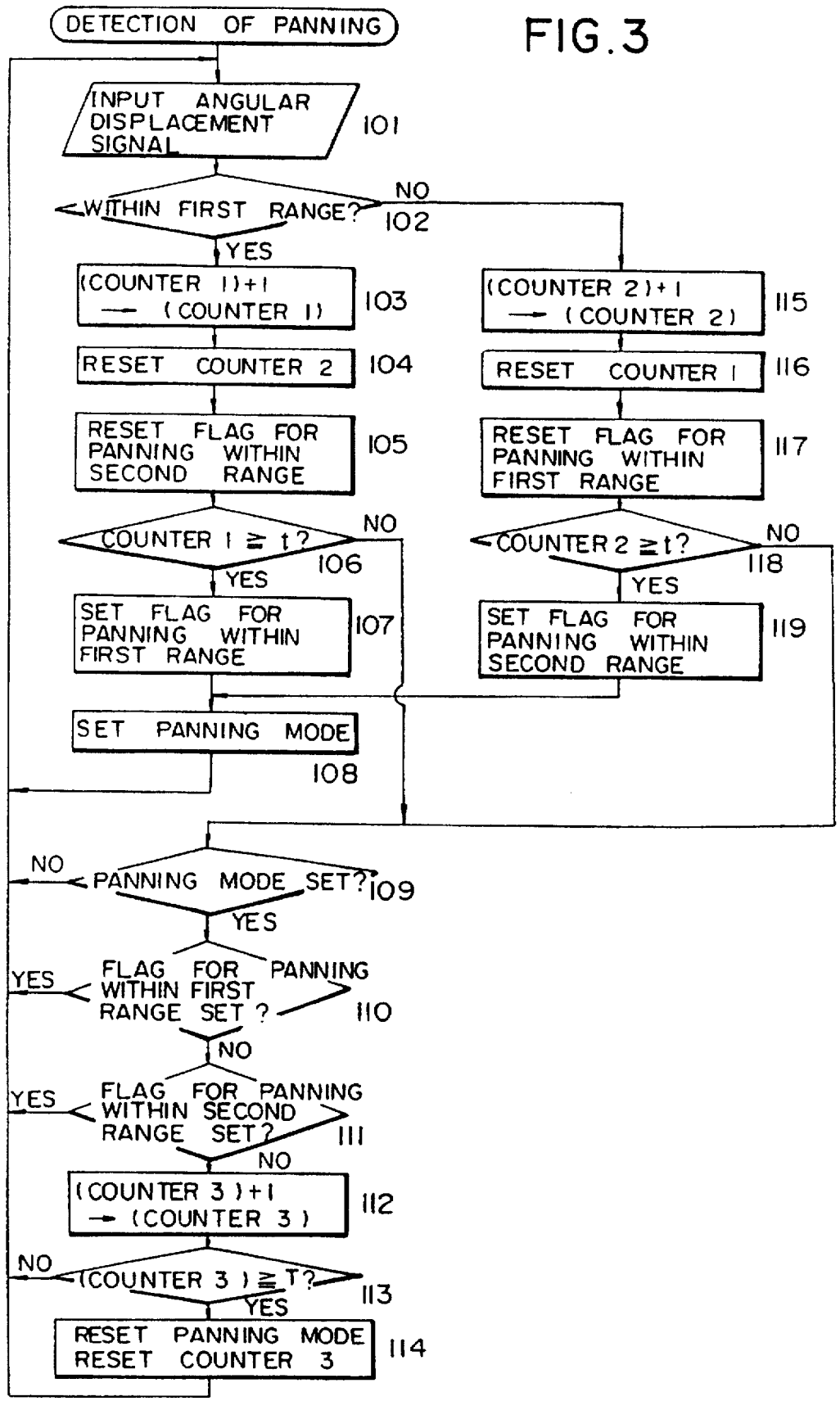
FIG. 3 is a flowchart showing the operation for detecting panning according to the first embodiment of the present invention.

Next, the operation in which the panning detecting means 803 is formed by a microcomputer will be explained with reference to the flowchart of FIG. 3.

[Step 101] An angular displacement signal from the angular velocity detecting means 801 via the integrating means 802 is digitized in an A/D converter or the like.

[Step 102] A determination is made whether the input angular displacement signal is present within the first range shown in FIG. 2, i.e., a first operation state or condition. When it is present within the first range, the process proceeds to step 103; when it is not, that is, when it is present within the second range, i.e., a second operation state or condition, the process proceeds to step 115.

[Step 103] A counter 1 for counting the occurrence that the angular displacement signal remains in the first range is incremented by "1".

[Step 104] Another counter 2, for use when the signal remains in the second range is reset.

[Step 105] A second-range flag for indicating panning within the second range indicating that the signal remains within the second range and that panning is taking place is reset.

[Step 106] A determination is made whether the count value of the counter 1 has reached the count number indicating predetermined time t by which it is determined that panning has taken place. When the count number has been reached, the process proceeds to step 107; when not reached, the process proceeds to step 109.

[Step 107] In this step, a panning within-first-range flag is set, indicating panning within the first range.

[Step 108] A panning mode flag for indicating panning is set, and the correction value computing means 804 is notified that the photographic mode is panning.

When it is determined in step 102 that the input angular displacement signal is not within the first range, i.e., it is within the second range, the process proceeds to step 115 as mentioned earlier.

[Step 115] The counter 2 for counting the occurrence that the angular displacement signal remains within the second range, is incremented by "1".

[Step 116] The counter 1 for use when the signal remains within the first range is reset.

[Step 117] The first-range-flag for indicating that any displacement signal is within the first range, indicating that the angular displacement signal remains within the first range and that panning is taking place is reset.

[Step 118] A determination its made whether the count value of the counter 2 has reached the count number indicating predetermined time t by which it is determined that panning has occurred. When the count number has been reached, the process proceeds to step 119; when it has not been reached, the process proceeds to step 109.

[Step 119] In this step, panning-within-second-range flag is set, indicating panning within the first range. The process then proceeds to step 108 described above.

[Step 109] The photographic mode is checked. If it is the panning mode, the process proceeds to step 110; if it is not, the process returns to step 101.

[Step 110] In this step, the panning within-first-range flag is checked. If it indicates that panning is taking place, the process returns to step 101; if it does not, the process proceeds to step 111.

[Step 111] The flag for indicating panning within-second-range is checked. If it indicates that panning is taking place, the process returns to the above-described step 101; if it does not, the process proceeds to step 112.

[Step 112] A counter 3 for indicating the elapsed time after the angular displacement signal has crossed the center at least one time is incremented by "1".

[Step 113] A determination is made whether the count value of the counter 3 has reached the count number indicating predetermined time T by which it is determined that the panning operation has terminated. If the number has not been reached, the process returns to step 101; if it has been reached, the process proceeds to step 114.

[Step 114] The panning mode and the counter 3 are reset, and the process returns to step 101.

Next, a second embodiment of the present invention will be explained. The circuitry of the image blur prevention apparatus of the second embodiment is the same as in FIG. 1, but the method of detecting panning of the panning determination means 803 is different.

Figure 4:
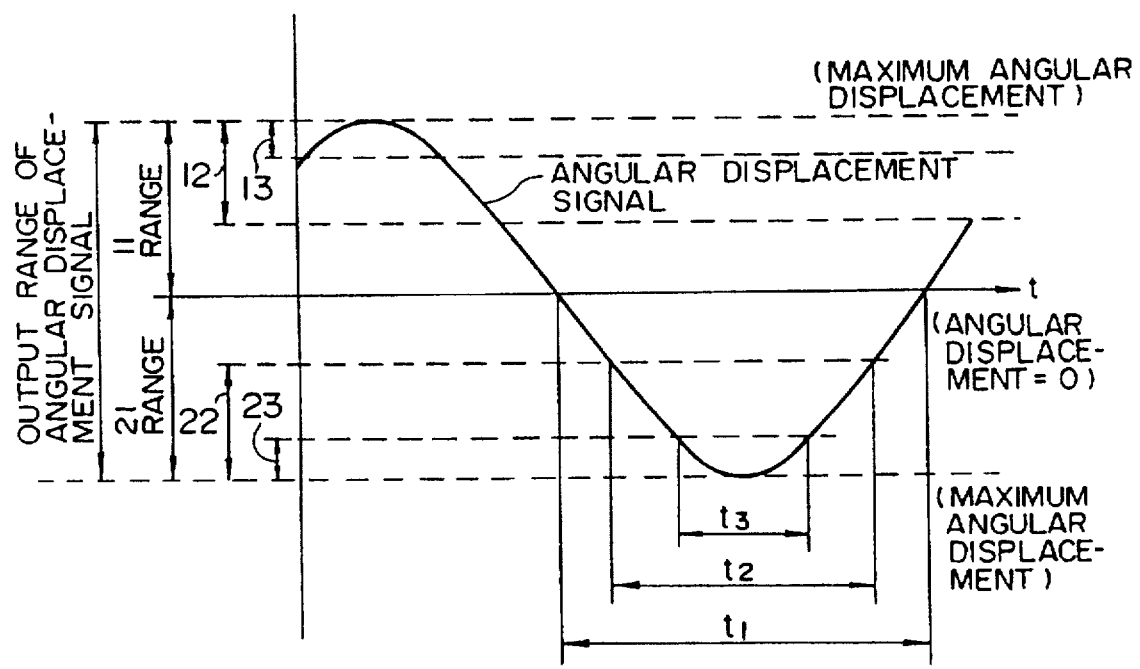
FIG. 4 illustrates detection of panning according to a second embodiment of the present invention.

FIG. 4 illustrates detection of panning by the panning detecting means 803 according to this embodiment.

In this embodiment, as shown in FIGS. 4, 11 and 21 ranges (corresponding to the first and second ranges in the first embodiment) are divided further into a plurality of ranges. Even when, for example, camera shake of a large amplitude occurs, namely, even when it reaches the limit of correction by the correction optical system 806, there is no case in which the angular displacement signal does not cross the central point for a period of time t1 or more. Therefore, the panning condition is determined by the time during which the signal continues to remain within a certain range.

In this embodiment, if time limits in which the angular displacement signal remains within a certain range are denoted as time t2 for ranges 12 and 22, and time t3 for ranges 13 and 23, it can be detected that the photographic apparatus will undergo panning in time t3 at the earliest time.

Figure 5:
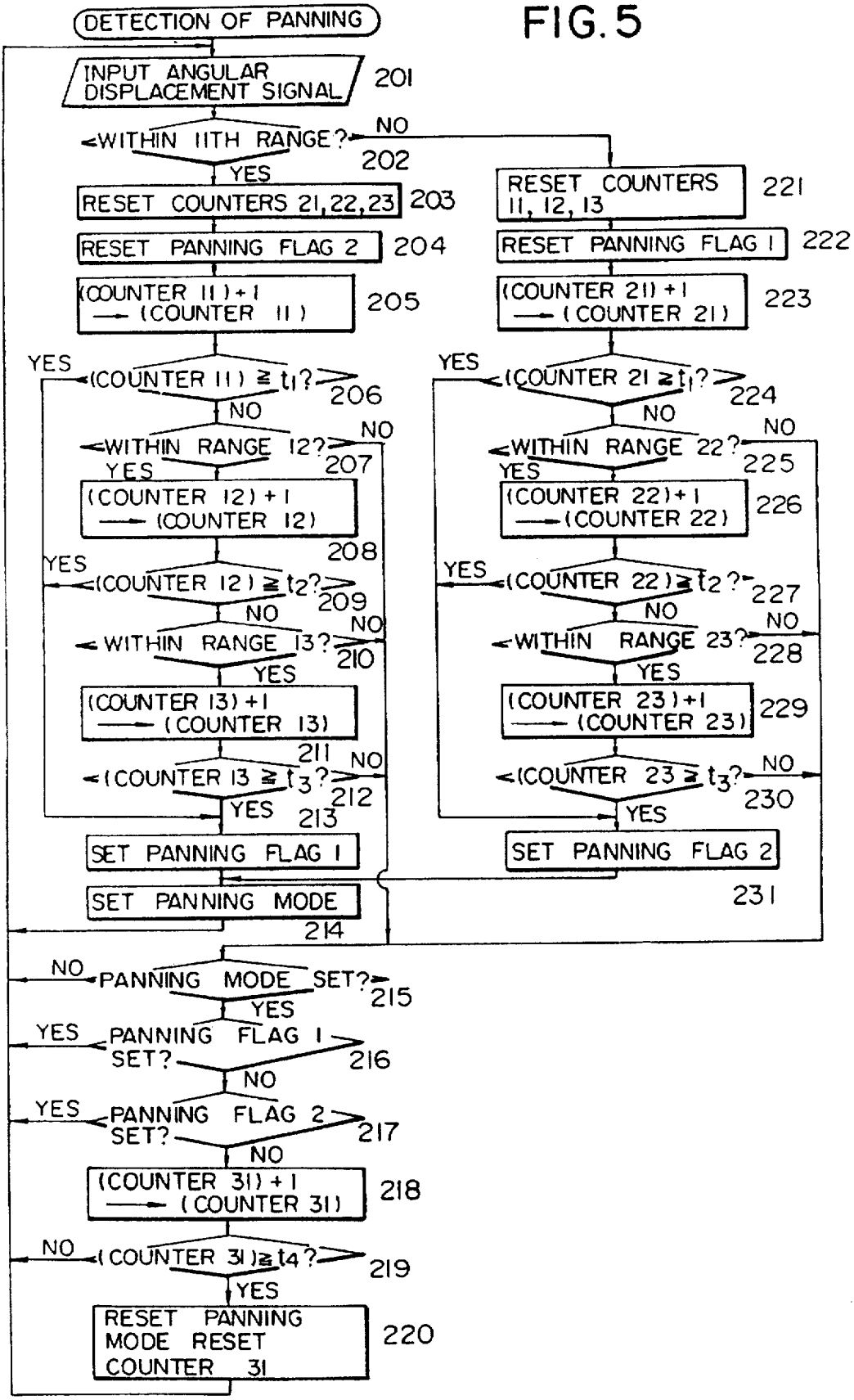
FIG. 5 is a flowchart showing the operation for detecting panning according to the second embodiment of the present invention.

Next, the operation in which the panning detecting means 803 is formed by a microcomputer in this embodiment will be explained with reference to the flowchart of FIG. 5.

[Step 201] An angular displacement signal from the angular velocity detecting means 801 via the integrating means 802 is digitized in an A/D converter or the like.

[Step 202] A determination is made whether the input angular displacement signal is present within the 11 range shown in FIG. 4. When it is present within the 11 range, the process proceeds to step 203; when it is not, that is, it is present within the 21 range, the process proceeds to step 221.

[Step 203] Counters 21, 22 and 23 indicating the time during which the angular displacement signal remains within the other ranges (the 21, 22, and 23 ranges) are reset.

[Step 204] A panning flag 2 indicating that the angular displacement signal remains within the other ranges (the 21, 22, and 23 ranges) and that panning is taking place are reset.

[Step 205] A counter 11 indicating that the angular displacement signal remains within the 11 range is incremented by "1".

[Step 206] In this step, a determination is made whether the count value of the counter 11 has reached the count number indicating time t1 shown in FIG. 4 by which it is determined that panning has taken place. If the count number has not been reached, the process proceeds to step 207; if it has been reached, the process proceeds to step 213.

[Step 207] A determination is made whether the angular displacement signal is present within the 12 range included in the 11 range. If it is not present, the process proceeds to step 215; if present, the process proceeds to step 208.

[Step 208] A counter 12 for counting the occurrence that the angular displacement signal remains within the 12 range is incremented by "1".

[Step 209] In this step, a determination is made whether the count value of the counter 12 has reached the count number indicating time t2 shown in FIG. 4 by which it is determined that panning has taken place. If the count number has not been reached, the process proceeds to step 210; if it has been reached, the process proceeds to step 213.

[Step 210] A determination is made whether the angular displacement signal is present within the 13 range included in the 11 and 12 ranges. If it is not present, the process proceeds to step 215; if present, the process proceeds to step 211.

[Step 211] A counter 13 for counting the occurrence that the angular displacement signal remains within the 13 range is incremented by "1".

[Step 212] In this step, a determination is made whether the count value of the counter 13 has reached the count number indicating time t3 shown in FIG. 4 by which it is determined that panning has taken place. If the count number has not been reached, the process proceeds to step 215; if it has been reached, the process proceeds to step 213.

When it is determined in steps 206, 209, or 212 that the count value has reached the predetermined count number, the process proceeds to step 213 as mentioned above.

[Step 213] The panning flag 1 indicating that panning is taking place within the 11 range is set.

[Step 214] A flag for a panning mode indicating that panning is taking place is set. The correction value computing means 804 is notified that the photographic mode is panning. Thereafter, the process returns to step 201.

As mentioned earlier, if the angular displacement signal received in step 202 is not present within the first range shown in FIG. 4 and present within the 21 range, the process proceeds to step 221.

[Step 221] The counters 11, 12 and 13 indicating the time during which the angular displacement signal remains within the other ranges (the 11, 12, and 13 ranges) are reset.

[Step 222] The panning flag 1 indicating that the angular displacement signal remains within the other ranges (the 11, 12, and 13 ranges) and that panning is taking place are reset.

[Step 223] The counter 11 indicating that the angular displacement signal remains within the 21 range is incremented by "1".

[Step 224] In this step, a determination is made whether the count value of the counter 21 has reached the count number indicating time t1 shown in FIG. 4, by which it is determined that panning has occurred. If the count number has not been reached, the process proceeds to step 225; if it has been reached, the process proceeds to step 231.

[Step 225] A determination is made whether the angular displacement signal is present within the 22 range included in the 21 range. If it is not present, the process proceeds to step 215; if present, the process proceeds to step 226.

[Step 226] The counter 22 for counting the occurrence that the angular displacement signal remains within the 22 range is incremented by "1".

[Step 227] In this step, a check is made to determine whether the count value of the counter 22 has reached the count number indicating time t2 shown in FIG. 4 by which it is determined that panning has taken place. If the count number has not been reached, the process proceeds to step 228; if it has been reached, the process proceeds to step 231.

[Step 228] A determination is made whether the angular displacement signal is present within the 23 range included in the 21 and 22 ranges. If it is not present, the process proceeds to step 215; if present, the process proceeds to step 229.

[Step 229] The counter 23 for counting the occurrence that the angular displacement signal remains within the 23th range is incremented by "1".

[Step 230] In this step, a determination is made whether the count value of the counter 23 has reached the count number indicating time t3 shown in FIG. 4 by which it is determined that panning has taken place. If the count number has not been reached, the process proceeds to step 215; if it has been reached, the process proceeds to step 231.

When it is determined in the above-described step 224, 227 or 230 that the count value has reached the predetermined count number, the process proceeds to step 231 as mentioned earlier.

[Step 231] The panning flag indicating that panning is taking place within the 21 range is set, and the process proceeds to step 214 described above. A panning mode flag indicating that panning is taking place is set. The correction value computing means 804 is notified that the photographic mode is panning. Thereafter, the process returns to step 201.

[Step 215] The panning mode is checked. If the photographic mode is the panning mode, the process proceeds to step 216; if not, the process returns to step 201.

[Step 216] The panning flag 1 is checked. If panning is taking place, the process returns to the above-described step 201; if not, the process proceeds to step 217.

[Step 217] The panning flag 2 is checked. If panning is taking place, the process returns, to the above-described step 201; if not, the process proceeds to step 218.

[Step 218] The counter 31 indicating the elapsed time after the angular displacement signal has crossed the central point at least one time is incremented by "1".

[Step 219] A determination is made whether the count value of the counter 31 has reached the count number indicating predetermined time t4 by which panning is determined to be terminated. If the count number has not been reached, the process returns to step 201; if reached, the process proceeds to step 220.

[Step 220] The panning mode and the counter 31 are reset, and the process returns to step 201.

If the above-described operation is performed at fixed time intervals (by interruption or the like) by the microcomputer, time can be processed by the count number because time may be thought to be equivalent to the count number as described above.

The above-described range may be divided with time as a reference. In such a case, any amount of time may be used to perform this detection.

According to the above-described embodiments, the frequency of camera shake can be assumed to be 0.5 to tens of Hz. It is believed that the output signal from the angular velocity detecting means 801 usually crosses the central point (where the shake signal=0) within a given amount of time in the camera-shake condition. Therefore, when the signal does not cross the central point within a given amount of time, in other words, when the camera shake signal continues in the same direction for a fixed amount of time, it is determined that panning is taking place. As a result, the occurrence of panning can be automatically determined, enhancing the maneuverability of the camera. As a result, the quality of the photographed image is not diminished, and the photographer is not made to feel uneasy.

The panning determination means 803 may be arranged so that the panning mode is terminated when the means 803 determines that the angular displacement signal has crossed the central point a predetermined number of times within a given amount of time, and the operation then shifts to the normal blur correction mode. The predetermined number of times may be set at two or more by taking into consideration that panning may slow down in speed or stop temporarily. With this arrangement, it becomes possible to very smoothly continue the photographing operation from the panning mode to the normal blur correction mode without giving the photographer a sense of incongruity.

In one example of this embodiment, an angular velocity (displacement) signal obtained by the angular velocity detecting means 810, i.e., a camera shake signal, is monitored as a signal for detecting panning.

It goes without saying that the present invention is not limited to this example, but the same determination as above is possible by receiving an angular displacement signal of the correction optical system 806, which is output from the means 807 for detecting the angular displacement of the correction optical system.

According to the above-described embodiments, there is provided an image-plane movement detecting means for detecting image plane movement on the basis that a signal from shaking detecting means is a shaking signal in one direction for a predetermined amount of time; and/or on the basis that a signal from displacement detecting means of the correction optical system is a displacement signal in one direction for a predetermined amount of time. Thus, if such a signal occurs, a determination is made that there is image plane movement because the signal from the shaking detecting means and/or the displacement detecting means will not become a shaking signal or a displacement signal in one direction for a predetermined amount of time except in the case of image plane movement, such as panning.

As a result, a determination of whether there is image plane movement can be automatically and reliably performed, and camera responsiveness to his operation can be increased. The quality of the photographed image is not diminished, and the photographer is not made to feel uneasy.

In addition, the image-plane movement detecting means is provided with detecting means for detecting that image plane movement has terminated when a signal indicating that the amount of shaking is zero is output at least one time within a given amount of time from the shaking detecting means; and/or when a signal indicating that the amount of displacement is zero is output at least one time within a given amount of time from the displacement detecting means. Thus, when a signal indicating that the amount of shaking or displacement is zero is output at least one time within a given amount of time after the detection of the image plane movement, the image plane movement is determined to be terminated.

As a result, it is possible to automatically and reliably determine that the image plane movement has terminated, and to shift from this operation to the normal blur correction mode.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the present invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted for a device having a direction of aiming and an image shake prevention device which prevents an image shake caused by a fluctuation, and which is used with a signal processing circuit that forms an annular displacement signal in accordance with an angular velocity signal corresponding to the fluctuation, said apparatus comprising:

a determination device which (1) detects whether the angular displacement signal crosses a predetermined value indicating non-displacement and (2) determines that an aiming direction changing operation for changing a direction of aiming of an object, the image of which is formed, is performed in accordance with a detection that the angular displacement signal does not cross the predetermined value.

2. An apparatus according to claim 1, wherein said determination device includes means for determining that the aiming direction changing operation is performed in accordance with a detection that the angular displacement signal does not cross the predetermined value during a predetermined time.

3. An apparatus according to claim 1, wherein said determination device includes means for determining that the aiming direction changing operation is completed in accordance with a detection that the angular displacement signal crosses the predetermined value.

4. An apparatus according to claim 3, wherein said determination device includes means for determining that the aiming direction changing operation is completed in accordance with a detection that the angular displacement signal crosses the predetermined value a predetermined number of times during the predetermined time.

5. An apparatus according to claim 1, further comprising a restriction device which restricts an image shake prevention operation of the image shake prevention device in accordance with a determination that the aiming direction changing operation is performed.

6. An apparatus according to claim 5, wherein said determination device includes means for determining that the aiming direction changing operation is completed by a predetermined determination method, and said restriction device includes means for releasing a restriction operation in accordance with a determination that the aiming direction changing operation is completed.

7. An apparatus according to claim 1, wherein said determination device includes means for performing said detection operation with respect to a signal corresponding to the fluctuation in a device which forms an image.

8. An apparatus according to claim 1, wherein said determination device includes means for performing said detection operation with respect to a signal obtained by integrating a signal corresponding to a fluctuation velocity.

9. An apparatus according to claim 1, wherein the image shake prevention device includes means for preventing image shake by moving a movable member.

10. An apparatus according to claim 1, wherein the image shake prevention device includes means for optically preventing image shake.

11. An apparatus according to claim 1, wherein the image shake prevention device includes means for correcting image shake.

12. An apparatus according to claim 1, wherein the image shake prevention device includes means for preventing image shake in accordance with the angular displacement signal.

13. An apparatus according to claim 12, wherein the image shake prevention device includes a movable member for moving so as to prevent image shake in accordance with the angular displacement signal.

14. An apparatus according to claim 1, further comprising a photographing device, said determination device including means for determining that a photographing direction changing operation for changing a photographing direction in the photographing device is performed.

15. An image shake prevention apparatus adapted for a device having a direction of aiming, said apparatus comprising:

an image shake prevention device which prevents an image shake caused by a fluctuation;

a signal processing circuit that forms an angular displacement signal in accordance with an angular velocity signal corresponding to the fluctuation; and a determination device which (1) detects whether the angular displacement signal crosses a predetermined value indicating non-displacement and (2) determines that an aiming direction changing operation for changing a direction of aiming of an object, the image of which is formed, is performed in accordance with a detection that the angular displacement signal does not cross the predetermined value.

16. An optical apparatus having a direction of aiming and adapted for an image shake prevention device which prevents an image shake caused by a fluctuation, said apparatus comprising:

a signal processing circuit that forms an angular displacement signal in accordance with an angular velocity signal corresponding to the fluctuation; and a determination device which (1) detects whether the angular displacement signal crosses a predetermined value indicating non-displacement and (2) determines that an aiming direction changing operation for changing a direction of aiming of an object, the image of which is formed, is performed in accordance with a detection that the angular displacement signal does not cross the predetermined value.

17. An apparatus according to claim 16, further comprising a photographing device, said determination device including means for determining that a photographing direction changing operation for changing a photographing direction in the photographing device is performed.

18. An apparatus according to claim 16, wherein said determination device includes means for performing said detection operation with respect to a signal corresponding to the fluctuation in a device which forms an image.

19. An apparatus according to claim 16, wherein said determination device includes means for performing said detection operation with respect to a signal obtained by integrating a signal corresponding to a fluctuation velocity.

20. An apparatus according to claim 16, wherein the image shake prevention device includes means for preventing image shake by moving a movable member.

21. An apparatus according to claim 16, wherein the image shake prevention device includes means for optically preventing image shake.

22. An apparatus according to claim 16, wherein the image shake prevention device includes means for correcting image shake.

23. An apparatus according to claim 16, wherein the image shake prevention device includes means for preventing image shake in accordance with the angular displacement signal.

24. An apparatus according to claim 16, wherein the image shake prevention device includes a movable member for moving so as to prevent image shake in accordance with the angular displacement signal.

25. A camera having a direction of aiming and adapted for an image shake prevention device which prevents an image shake caused by a fluctuation, said camera comprising:

a signal processing circuit that forms an angular displacement signal in accordance with an angular velocity signal corresponding to the fluctuation; and a determination device which (1) detects whether the angular displacement signal crosses a predetermined value indicating non-displacement and (2) determines that an aiming direction changing operation for changing a direction of aiming of an object, the image of which is formed, is performed in accordance with a detection that the angular displacement signal does not cross the predetermined value.

26. An apparatus adapted for a device having a direction of aiming and an image shake prevention device which prevents an image shake caused by a fluctuation, and which is used with a signal processing circuit that forms an angular displacement signal in accordance with an angular velocity signal corresponding to the fluctuation, said apparatus comprising:

a determination device which (1) detects whether the angular displacement signal crosses a predetermined value indicating non-displacement and (2) determines that an aiming direction changing operation for changing a direction of aiming of an object, the image of which is formed, is not performed in accordance with a detection that the angular displacement signal crosses the predetermined value.

27. An apparatus according to claim 26, wherein said determination device includes means for determining that the aiming direction changing operation is not performed in accordance with a detection that the angular displacement signal crosses the predetermined value a predetermined number of times.

28. An apparatus according to claim 27, wherein said determination device includes means for determining that the aiming direction changing operation is not performed in accordance with a detection that the angular displacement signal crosses the predetermined value the predetermined number of times during a predetermined time.

29. An apparatus according to claim 26, further comprising a releasing device which releases a restricting operation of a restriction device which restricts an image shake prevention operation of the image shake prevention device, wherein said releasing device releases the restricting operation of the restriction device in accordance with a determination that the aiming direction changing operation is not performed.

30. An image shake prevention apparatus adapted for a device having a direction of aiming, said apparatus comprising:
- an image shake prevention device which prevents an image shake caused by a fluctuation;
- a signal processing circuit that forms an angular displacement signal in accordance with an angular velocity signal corresponding to the fluctuation; and
- a determination device which (1) detects whether the angular displacement signal crosses a predetermined value indicating non-displacement and (2) determines that an aiming direction changing operation for changing a direction of aiming of an object, the image of which is formed, is not performed in accordance with a detection that the angular displacement signal crosses the predetermined value.

31. An optical apparatus having a direction of aiming and adapted for an image shake prevention device which prevents an image shake caused by a fluctuation, said apparatus comprising:
- a signal processing circuit that forms an angular displacement signal in accordance with an angular velocity signal corresponding to the fluctuation; and
- a determination device which (1) detects whether the angular displacement signal crosses a predetermined value indicating non-displacement and (2) determines that an aiming direction changing operation for changing a direction of aiming of an object, the image of which is formed, is not performed in accordance with a detection that the angular displacement signal crosses the predetermined value.

32. A camera having a direction of aiming and adapted for an image shake prevention device which prevents an image shake caused by a fluctuation, said camera comprising:
- a signal processing circuit that forms an angular displacement signal in accordance with an angular velocity signal corresponding to the fluctuation; and
- a determination device which (1) detects whether the angular displacement signal crosses a predetermined value indicating non-displacement and (2) determines that an aiming direction changing operation for changing a direction of aiming of an object, the image of which is formed, is not performed in accordance with a detection that the angular displacement signal crosses the predetermined value.

\* \* \* \* \*

UNITED STATES PATENT AND TRADEMARK OFFICE
CERTIFICATE OF CORRECTION

PATENT NO. : 5,745,799
DATED : April 28, 1998
INVENTOR(S) : TSUYOSHI MOROFUJI

It is certified that error appears in the above-indentified patent and that said Letters Patent is hereby corrected as shown below:

COLUMN 2

Line 56, "photographing," should read --photographing--.

COLUMN 3

Line 40, "comprising" should read --comprising:--.
    Line 41, "state" should read --state;--.

COLUMN 10

Line 23, "annular" should read --angular--.

Signed and Sealed this

Fifteenth Day of December, 1998

Attest:

BRUCE LEHMAN

*Attesting Officer*  *Commissioner of Patents and Trademarks*